United States Patent
Tanaka

(10) Patent No.: US 11,588,955 B2
(45) Date of Patent: Feb. 21, 2023

(54) APPARATUS, METHOD, AND COMPUTER PROGRAM FOR IMAGE CONVERSION

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 17/342,614

(22) Filed: Jun. 9, 2021

(65) Prior Publication Data

US 2021/0392238 A1 Dec. 16, 2021

(30) Foreign Application Priority Data

Jun. 11, 2020 (JP) .............................. JP2020-101821

(51) Int. Cl.
*H04N 1/60* (2006.01)
*G06T 7/90* (2017.01)
(Continued)

(52) U.S. Cl.
CPC ......... *H04N 1/6005* (2013.01); *G06K 9/6267* (2013.01); *G06T 7/90* (2017.01); *G06V 10/22* (2022.01); *G06V 20/182* (2022.01); *H04N 1/6008* (2013.01); *G06T 2207/10024* (2013.01); *G06T 2207/10032* (2013.01); *G06T 2207/30184* (2013.01)

(58) Field of Classification Search
CPC .. H04N 1/6005; H04N 1/6008; H04N 1/6027; H04N 1/6072; G06K 9/6267; G06T 7/90; G06T 2207/10024; G06T 2207/10032; G06T 2207/30184; G06T 5/008; G06T 3/0012; G06V 10/22; G06V 20/182; G06V 10/507; G06V 10/56; G06V 10/60; G06V 10/82; G06V 20/13
See application file for complete search history.

(56) References Cited

U.S. PATENT DOCUMENTS

2008/0195303 A1 8/2008 Jung et al.
2012/0087578 A1* 4/2012 Nakajima ................. G06T 7/11
382/164

FOREIGN PATENT DOCUMENTS

| JP | H11283012 A | 10/1999 |
| JP | 2006195032 A | 7/2006 |
| JP | 2008509441 A | 3/2008 |

* cited by examiner

Primary Examiner — Christopher Wait
(74) Attorney, Agent, or Firm — Dickinson Wright, PLLC

(57) ABSTRACT

An apparatus for image conversion includes a processor configured to classify a reference region representing a predetermined feature into a shadowed region and an unshadowed region, the reference region being in an aerial image represented in RGB color space; determine a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region represented in RGB color space; correct tones of the aerial image with the tone correction factor; and convert the color space of the aerial image from RGB color space to the predetermined color space to generate a color conversion image.

6 Claims, 5 Drawing Sheets

(51) Int. Cl.
*G06K 9/62* (2022.01)
*G06V 10/22* (2022.01)
*G06V 20/10* (2022.01)

APPARATUS, METHOD, AND COMPUTER PROGRAM FOR IMAGE CONVERSION

FIELD

The present invention relates to an apparatus, a method, and a computer program for image conversion for converting a color space representing the colors of an image.

BACKGROUND

A technique has been proposed to generate a map from an image representing a satellite or air photograph (see, e.g., Japanese Unexamined Patent Publication No. 2008-509441). For example, Japanese Unexamined Patent Publication No. 2008-509441 discloses a method for displaying map information in which a display of areas representing a top view of a map detail in a two-dimensional or three-dimensional view is at least partially based on an aerial and/or satellite photograph.

SUMMARY

To generate a map from an image, it is desirable that information to be included in the map, e.g., road markings represented on roads can be correctly detected from the image. However, an image representing a satellite or air photograph may include a region where a shadow of a building, for example, is cast and a region where no shadow is cast. It may be difficult to accurately detect road markings from such an image.

It is an object of the present invention to provide an apparatus for image conversion that facilitates detection of road markings represented in an aerial image.

As an aspect, an apparatus for image conversion is provided. The apparatus includes a processor configured to classify a reference region representing a predetermined feature into a shadowed region where a shadow is cast and an unshadowed region where no shadow is cast, the reference region being in an aerial image represented in RGB color space; determine a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; and correct tones of the aerial image with the tone correction factor and convert the color space of the aerial image from RGB color space to the predetermined color space to generate a color conversion image.

The processor of the apparatus is preferably further configured to detect, as the reference region, a road region representing a road as the predetermined feature from the aerial image.

The processor of the apparatus is preferably further configured to detect a road marking from the color conversion image.

In the apparatus, the predetermined color space is preferably color space represented by measures including luminance or brightness or obtained by normalizing, with a color component included in RGB color space, the other color components included in RGB color space.

As another aspect, a method for image conversion is provided. The method includes: classifying a reference region representing a predetermined feature into a shadowed region where a shadow is cast and an unshadowed region where no shadow is cast, the reference region being in an aerial image represented in RGB color space; determining a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; and correcting tones of the aerial image with the tone correction factor and converting the color space of the aerial image from RGB color space to the predetermined color space to generate a color conversion image.

As still another aspect, a non-transitory recording medium having recorded thereon a computer program for image conversion is provided. The computer program includes instructions causing a computer to execute a process including: classifying a reference region representing a predetermined feature into a shadowed region where a shadow is cast and an unshadowed region where no shadow is cast, the reference region being in an aerial image represented in RGB color space; determining a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; and correcting tones of the aerial image with the tone correction factor and converting the color space of the aerial image from RGB color space to the predetermined color space to generate a color conversion image.

The apparatus for image conversion according to the present invention has an advantageous effect of being able to facilitate detection of road markings represented in an aerial image.

DESCRIPTION OF EMBODIMENTS

Figure 1:
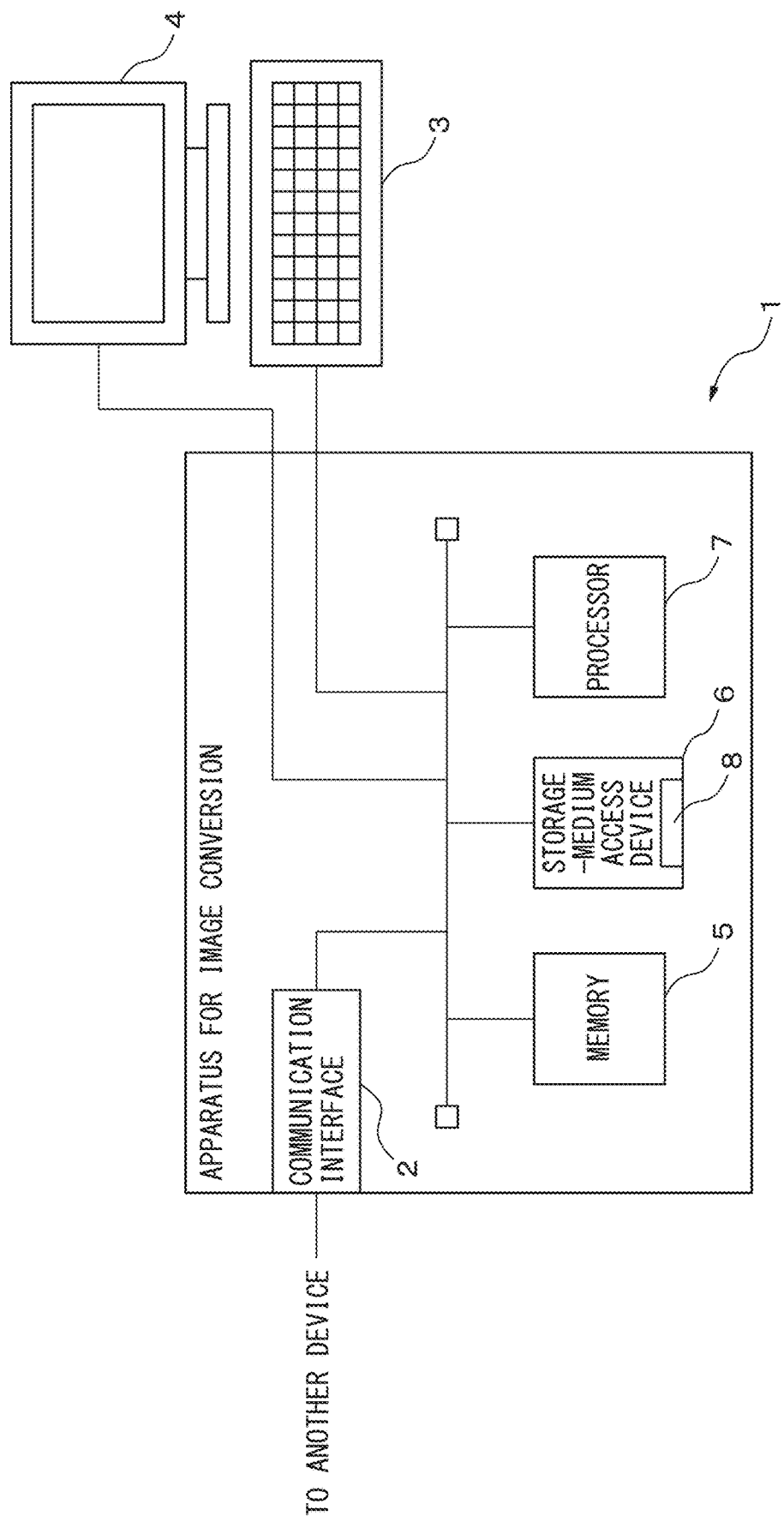
FIG. 1 illustrates the hardware configuration of an apparatus for image conversion according to an embodiment.

Hereinafter, an apparatus for image conversion, and a method and a computer program therefor used by the apparatus will be described with reference to the accompanying drawings.

It is preferable that "high-precision-map information" used for automated driving control of a vehicle include information on each lane of individual roads, in particular, information related to road markings, such as lane division lines, stop lines, or arrows indicating traffic distributions of respective travel directions, so that a vehicle controller can appropriately perform control concerning lane changing, merging, or passing by referring to the high-precision-map information. One possible way to generate such high-precision-map information is to use an aerial image representing roads, such as an image representing an aerial or satellite photograph. In such an aerial image, a road may include a region where a shadow is cast and a region where no shadow is cast because the road is partially covered by a shadow of a building near the road. The greater the difference between the luminance of the region where a shadow is cast and that of the region where no shadow is cast, the more it becomes difficult to accurately detect road markings from the aerial image.

The apparatus for image conversion converts the color space of an aerial image from RGB color space to predetermined color space so that the contrast between a shadowed region where a shadow is cast and an unshadowed region where no shadow is cast in the aerial image represented in RGB color space may be reduced. To this end, the apparatus determines a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; the shadowed and unshadowed regions are included in a reference region representing a predetermined feature. The apparatus then corrects tones of the aerial image with the determined tone correction factor and converts the color space of the aerial image from RGB color space to the predetermined color space. In this way, a color conversion image is obtained such that the contrast between the shadowed and unshadowed regions is lower than the contrast therebetween in the original aerial image. For this reason, road markings are easily detected from the obtained color conversion image.

In the embodiment or modified examples described below, a target aerial image for an image conversion process may be, for example, a color image representing a high-resolution satellite or air photograph and represented in RGB color space. In the following description, an aerial image represented in RGB color space may be simply referred to as an aerial image. In the present specification, RGB color space refers to color space in which a color is represented by a combination of red (R), green (G), and blue (B). Hence, for example, sRGB color space and RGBA color space are also included in the RGB color space.

FIG. 1 illustrates the hardware configuration of the apparatus for image conversion. As illustrated in FIG. 1, the apparatus 1 includes a communication interface 2, an input device 3, a display 4, a memory 5, a storage-medium access device 6, and a processor 7.

The communication interface 2 includes a communication interface and a control circuit thereof that are compliant with a communication standard, such as Ethernet (registered trademark), and used for connection to a communication network. The communication interface 2 receives various types of information or data from another device (not illustrated) connected via the communication network, and passes them to the processor 7. The data received by the communication interface 2 may include an aerial image representing roads, which is a target for an image conversion process, and information indicating a geographical area represented in the aerial image, such as the latitude and longitude of a predetermined location in a region represented in the aerial image (e.g., its upper left corner or center), the real-space sizes of this region measured in the horizontal and vertical directions, and the bearing. The communication interface 2 may output a color conversion image or information indicating road markings detected therefrom (hereafter, "road-marking information") to another device via the communication network. This image or information is received from the processor 7 and obtained by executing the image conversion process.

The input device 3 includes, for example, a keyboard and a pointing device, such as a mouse. The input device 3 generates an operation signal in response to an operation by a user, such as an operation for selecting an aerial image as a target of the image conversion process, for giving instructions to start execution of the image conversion process, or for causing a generated color conversion image or road-marking information detected therefrom to appear on the display 4, and outputs the operation signal to the processor 7.

The display 4 includes, for example, a liquid crystal display or an organic electroluminescent display. The display 4 displays data for display received from the processor 7, such as data representing candidates for an aerial image to which the image conversion process is applied, or a generated color conversion image, road-marking information detected therefrom, or a portion thereof.

The input device 3 and the display 4 may be integrated into a single device like a touch panel display.

The memory 5, which is an example of a storage unit, includes, for example, a readable-writable semiconductor memory and a read-only semiconductor memory. The memory 5 stores, for example, a computer program for the image conversion process executed by the processor 7; various types of data used in the image conversion process, such as a target aerial image for the image conversion process, and a set of parameters for specifying a classifier used in the image conversion process; and various types of data generated during execution of the image conversion process. The memory 5 may further store a generated color conversion image and road-marking information detected therefrom.

The storage-medium access device 6 accesses a storage medium 8, such as a magnetic disk, a semiconductor memory card, and an optical storage medium. The storage-medium access device 6 together with the storage medium 8 constitutes another example of the storage unit. The storage-medium access device 6 reads data stored in the storage medium 8, such as a computer program for the image conversion process to be executed on the processor 7 or a target aerial image for the image conversion process, and passes it to the processor 7. Alternatively, the storage-medium access device 6 may receive from the processor 7 a generated color conversion image or road-marking information detected therefrom, and write the color conversion image or the road-marking information to the storage medium 8.

The processor 7, which is an example of a processing unit, includes, for example, one or more CPUs and a peripheral circuit thereof. The processor 7 may further include arithmetic circuits for numerical operation, graphics processing, and logical operation. The processor 7 controls the overall operation of the apparatus 1, and executes the image conversion process on an aerial image representing roads.

Figure 2:
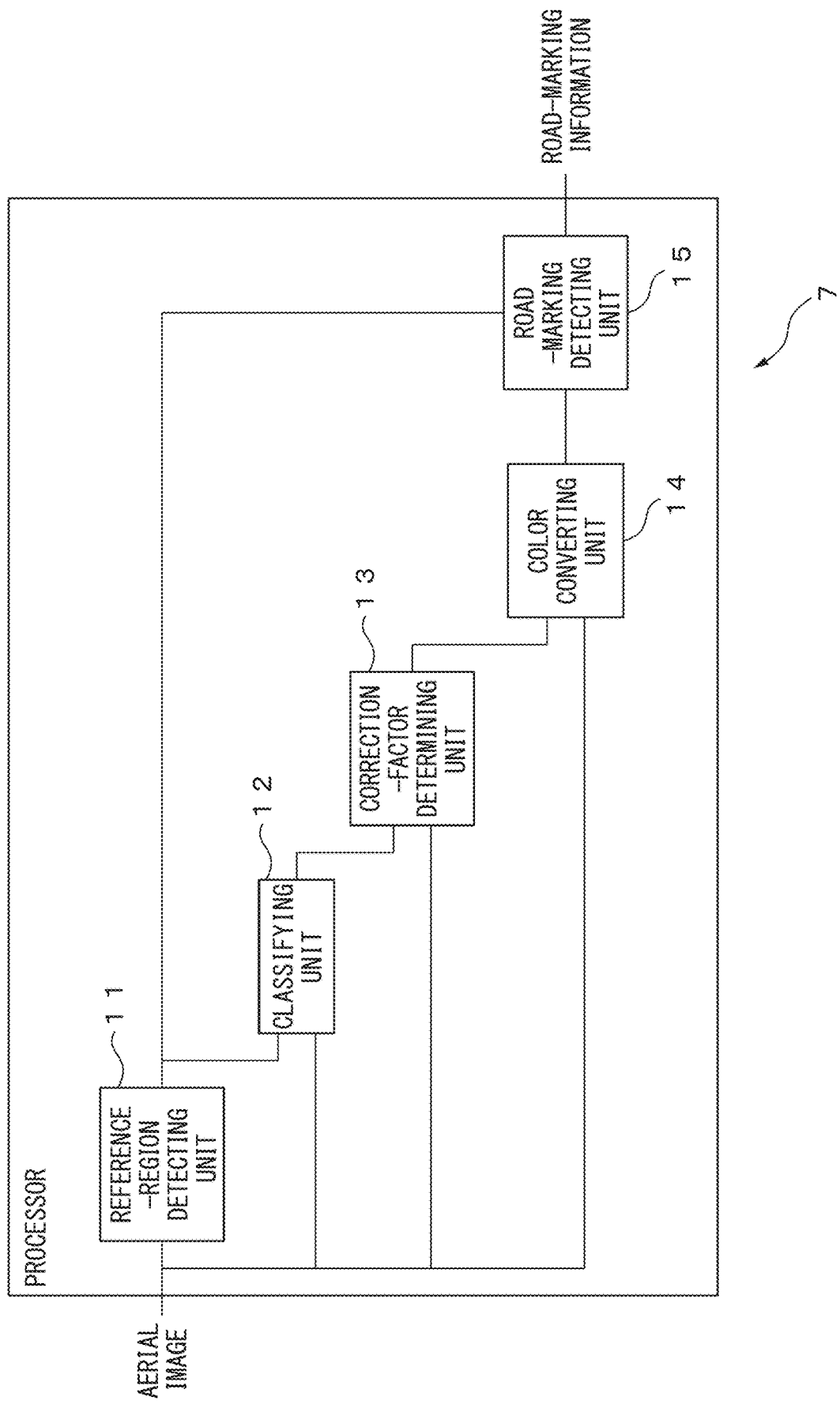
FIG. 2 is a functional block diagram of a processor of the apparatus for image conversion.

FIG. 2 is a functional block diagram of the processor 7. As illustrated in FIG. 2, the processor 7 includes a reference-region detecting unit 11, a classifying unit 12, a correction-factor determining unit 13, a color converting unit 14, and a road-marking detecting unit 15. These units included in the processor 7 are, for example, functional modules implemented by a computer program executed on the processor 7, or may be dedicated arithmetic circuits provided in the processor 7.

The reference-region detecting unit 11 detects, from a target aerial image, a reference region representing a predetermined feature and serving as a reference for determining a tone correction factor. In the present embodiment, the reference-region detecting unit 11 detects, as the reference region, a road region representing a road as the predetermined feature. To this end, the reference-region detecting unit 11 inputs, for example, a target aerial image into a classifier that has been trained to output, for each pixel of the image, the type of object represented in the pixel, thereby detecting a road region.

As the classifier, the reference-region detecting unit 11 may use, for example, a "deep neural network" (DNN) having a convolutional neural network (CNN) architecture. More specifically, the reference-region detecting unit 11 may use, as the classifier, a CNN for semantic segmentation, e.g., a CNN such as a fully convolutional network (FCN) (Long, J., Shelhamer et al., "Fully convolutional networks for semantic segmentation," In CVPR, 2015), U-Net, Seg-Net, PSPNet, or RefineNet. Alternatively, the reference-region detecting unit 11 may use, as the classifier, a classifier based on another semantic segmentation technique, such as a random forest.

The reference-region detecting unit 11 outputs information indicating the detected road region (hereafter, "road-region information") to the classifying unit 12 and the road-marking detecting unit 15. The road-region information may be, for example, a binary image in which pixels inside the road region and pixels outside the road region have different values, the binary image being the same size as the original aerial image.

The classifying unit 12 classifies the reference region detected from the aerial image into a shadowed region where a shadow is cast and an unshadowed region where no shadow is cast. In the present embodiment, the classifying unit 12 classifies a road region into a shadowed road region where a shadow is cast and an unshadowed road region where no shadow is cast.

In general, the luminance of a shadowed region is lower than that of an unshadowed region. Thus, in the present embodiment, the classifying unit 12 generates a histogram representing a luminance distribution from the luminance values of the pixels of the aerial image. Since this histogram is a combination of the luminance distribution of the shadowed region and that of the unshadowed region, it is supposed that this histogram is bimodal, i.e., has two peaks of frequency. Thus, of the two peaks of the generated histogram, the classifying unit 12 determines that one having a lower luminance value is a representative luminance value of the shadowed region, and that the other having a higher luminance value is a representative luminance value of the unshadowed region. To correctly detect the two peaks of the generated histogram, the classifying unit 12 may execute, on the generated histogram, a smoothing process in which the frequency of each luminance value of the histogram is substituted with an average of luminance values in a predetermined section including the substituted luminance value, or a process to calculate an envelope of the histogram. Then, the classifying unit 12 may detect the two peaks from the histogram to which the smoothing process was applied or from the envelope of the histogram. The classifying unit 12 determines a luminance threshold for distinguishing between the shadowed and unshadowed regions, based on the representative luminance values of the shadowed and unshadowed regions. For example, assuming that the luminance distributions of the shadowed and unshadowed regions are normal distributions, the classifying unit 12 determines the luminance threshold so that the Mahalanobis distance of the luminance distribution of the shadowed region may be equal to that of the luminance distribution of the unshadowed region. Alternatively, the classifying unit 12 may simply use the average of the representative luminance values of the shadowed and unshadowed regions or a luminance value having the lowest frequency between the representative luminance values of the shadowed and unshadowed regions as the luminance threshold. Alternatively, the classifying unit 12 may use a threshold obtained by applying Otsu's binarization to the histogram representing the luminance distribution as the luminance threshold for distinguishing between the shadowed and unshadowed regions.

After determining the luminance threshold, the classifying unit 12 determines that, of the pixels included in the road region, a set of pixels having luminance values not greater than the luminance threshold is the shadowed region, and that a set of pixels having luminance values greater than the luminance threshold is the unshadowed region.

Additionally, the classifying unit 12 detects a shadowed road region and an unshadowed road region respectively included in the shadowed and unshadowed regions of the road region detected from the aerial image. In the present embodiment, the classifying unit 12 detects, as the shadowed road region, the region where the set of pixels representing the shadowed region overlaps that of pixels representing the road region in the road-region information, and detects, as the unshadowed road region, the region where the set of pixels representing the unshadowed region overlaps that of pixels representing the road region in the road-region information.

Figure 3:
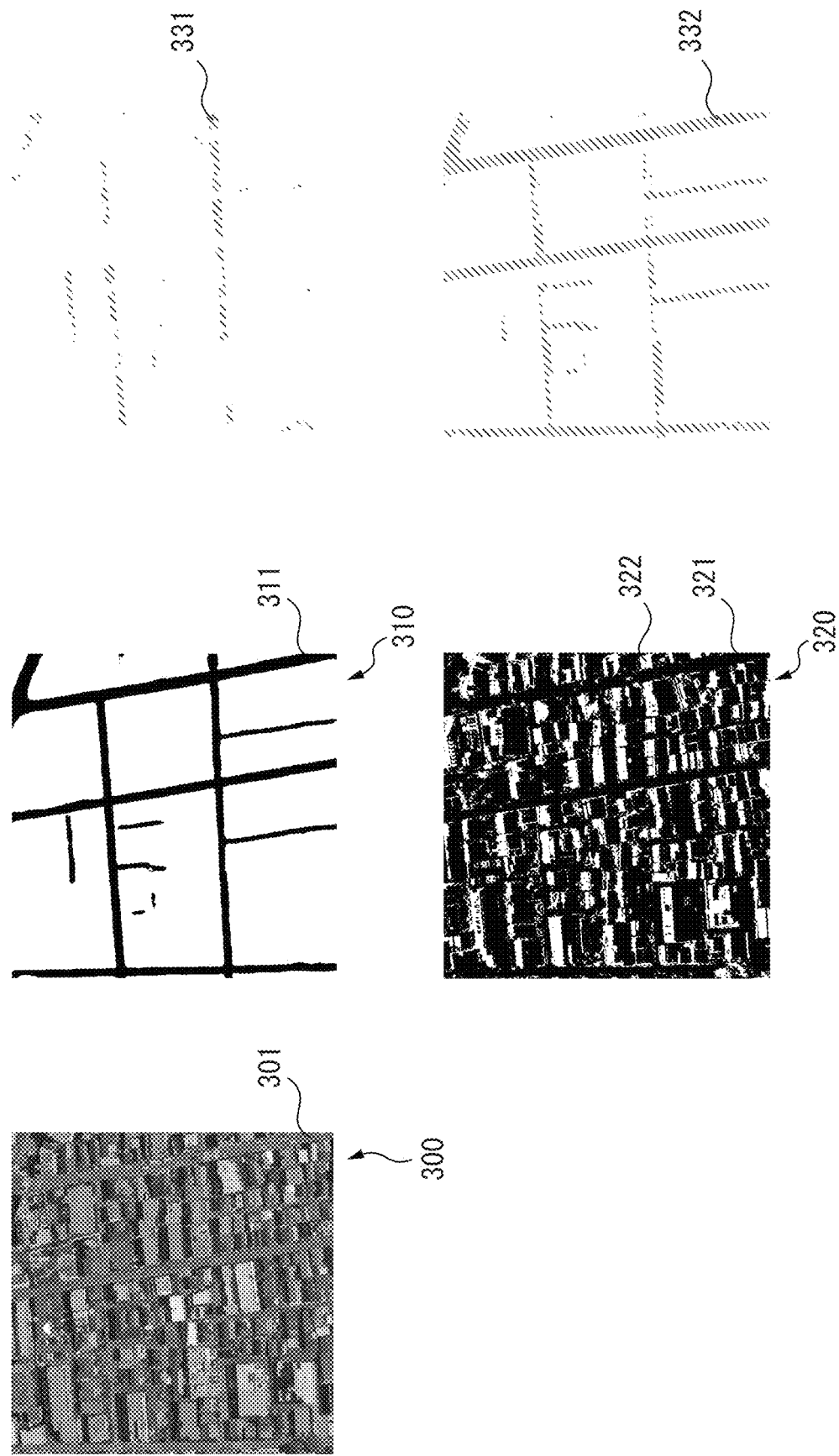
FIG. 3 is a diagram for explaining detection of a shadowed road region and an unshadowed road region.

FIG. 3 is a diagram for explaining detection of a shadowed road region and an unshadowed road region. As illustrated in FIG. 3, a part of a road 301 in an aerial image 300 is covered by a shadow of a building near the road, and another part of the region of the road 301 is covered by a shadow. Hence the region where a road region 311 represented by road-region information 310 indicating the road region detected from the aerial image 300 overlaps a shadowed region 321 represented by shadowed-region information 320 indicating the result of classifying the aerial image into shadowed and unshadowed regions is detected as a shadowed road region 331. The region where the road region 311 represented by the road-region information 310 overlaps an unshadowed region 322 represented by the shadowed-region information 320 is detected as an unshadowed road region 332.

The classifying unit 12 outputs shadowed-road-region information indicating the shadowed and unshadowed road regions to the correction-factor determining unit 13. The shadowed-road-region information may be, for example, an image in which pixels inside the shadowed road region, pixels inside the unshadowed road region, and pixels outside the shadowed and unshadowed road regions have different values, the image being the same size as the original aerial image.

The correction-factor determining unit 13 determines a tone correction factor applied to the aerial image. In the present embodiment, the correction-factor determining unit 13 determines the tone correction factor so that a difference between an average luminance of the shadowed road region and an average luminance of the unshadowed road region in predetermined color space to which the color space of the aerial image is converted from RGB color space is less than a difference between an average luminance of the shadowed road region and an average luminance of the unshadowed road region in the aerial image represented in RGB color space.

In the present embodiment, tone correction is applied to the aerial image in accordance with the γ transformation expressed by the following equation.

$$y=255*(x/255)^\gamma \quad (1)$$

Variables x and y are the luminance values of the pixels before tone correction and those of the pixels after tone correction, respectively. The luminance values of the pixels of the aerial image are assumed to be represented by 8 bits (i.e., 0 to 255). Factor γ is the tone correction factor.

First, the correction-factor determining unit 13 calculates the average of the luminance values of the pixels included in the shadowed road region of the original aerial image and that of the luminance values of the pixels included in the unshadowed road region thereof, and calculates the absolute value of the difference between the averages of the luminance values of the shadowed and unshadowed road regions (hereafter, the "difference in uncorrected average luminance"). To this end, the correction-factor determining unit 13 can calculate the luminance values of the pixels included in the shadowed road region and those of the pixels included in the unshadowed road region by executing a process to convert RGB color space to color space represented by measures including luminance (e.g., HLS color space) on the pixels included in the shadowed road region of the aerial image and those included in the unshadowed road region thereof.

The correction-factor determining unit 13 corrects the luminance values of the pixels of the shadowed and unshadowed road regions in accordance with equation (1), and calculates the absolute value of the difference between the average of the corrected luminance values of the pixels of the shadowed road region and that of the corrected luminance values of the pixels of the unshadowed road region (hereafter, the "difference in corrected average luminance"). To correct the luminance values of the pixels, the correction-factor determining unit 13 may correct, in accordance with equation (1), the values of color components of the pixels or those obtained by normalizing the color components of the pixels with any of the color components (e.g., R/B and G/B), and then convert RGB color space to color space represented by measures including luminance, as described above.

The correction-factor determining unit 13 executes the above-mentioned process while varying the tone correction factor γ in units of a predetermined amount, and thereby calculates the difference in corrected average luminance for each value of the tone correction factory and the absolute value of the difference between the difference in uncorrected average luminance and the difference in corrected average luminance. The correction-factor determining unit 13 then determines one of the values of the tone correction factor γ that makes the difference in corrected average luminance be less than the difference in uncorrected average luminance, as a tone correction factor γm to be applied to tone correction of the original aerial image. Of the values of the tone correction factor γ that make the difference in corrected average luminance be less than the difference in uncorrected average luminance, the correction-factor determining unit 13 preferably determines the value of the tone correction factor γ that makes the difference in corrected average luminance be minimal, as the tone correction factor γm to be applied to tone correction of the original aerial image. The tone correction factor γm determined in this way minimizes the contrast between the shadowed and unshadowed regions in the color conversion image, allowing for facilitating detection of road markings.

Alternatively, the correction-factor determining unit 13 may search for a tone correction factor γm that makes the difference in corrected average luminance be less than the difference in uncorrected average luminance and minimal, in accordance with a predetermined optimization technique, such as the steepest-descent method or simulated annealing. Even if the difference in corrected average luminance is not minimal, reducing the difference in corrected average luminance less than the difference in uncorrected average luminance produces an effect of facilitating detection of road markings to a certain extent, depending on the way a shadow is cast on a road in the original aerial image or the contrast between a road marking and a road surface therearound in the image. Thus, of the values of the tone correction factor γ for which the difference in corrected average luminance is calculated, the correction-factor determining unit 13 may determine, as the tone correction factor γm, a value of the tone correction factor γ that makes the difference in corrected average luminance be less than the difference in uncorrected average luminance but not minimal.

The correction-factor determining unit 13 notifies the color converting unit 14 of the determined tone correction factor γm.

The color converting unit 14 corrects tones of the aerial image with the determined tone correction factor γm and converts the color space of the aerial image from RGB color space to predetermined color space to generate a color conversion image.

The color converting unit 14 can correct the color components of the pixels of the aerial image in accordance with equation (1), using the determined tone correction factor γm as factory in equation (1), thereby correcting tones of the aerial image. Then, the color converting unit 14 may apply an equation to convert RGB color space to predetermined color space to the corrected color components of the pixels, thereby generating a color conversion image.

It is preferable that the predetermined color space be color space represented by measures including luminance or measures one of which indicates brightness similarly to luminance (e.g., lightness), such as HSV color space or HLS color space. Alternatively, the predetermined color space may be color space obtained by normalizing, with a color component of RGB color space, the other color components. Since both the shadowed and unshadowed road regions represent a road, it is supposed that, in the original aerial image also, the difference in the value of a measure other than luminance (or brightness) (e.g., hue or saturation) between a pixel included in the shadowed road region and a pixel included in the unshadowed road region is not as large as it affects detection of road markings. Thus, conversion of the color space of the aerial image after tone correction to color space like those described above, which includes a measure indicating luminance or brightness, makes the contrast between the shadowed and unshadowed road regions in the color conversion image be less than that in the original aerial image. This enables accurate detection of road markings from the color conversion image.

Figure 4:
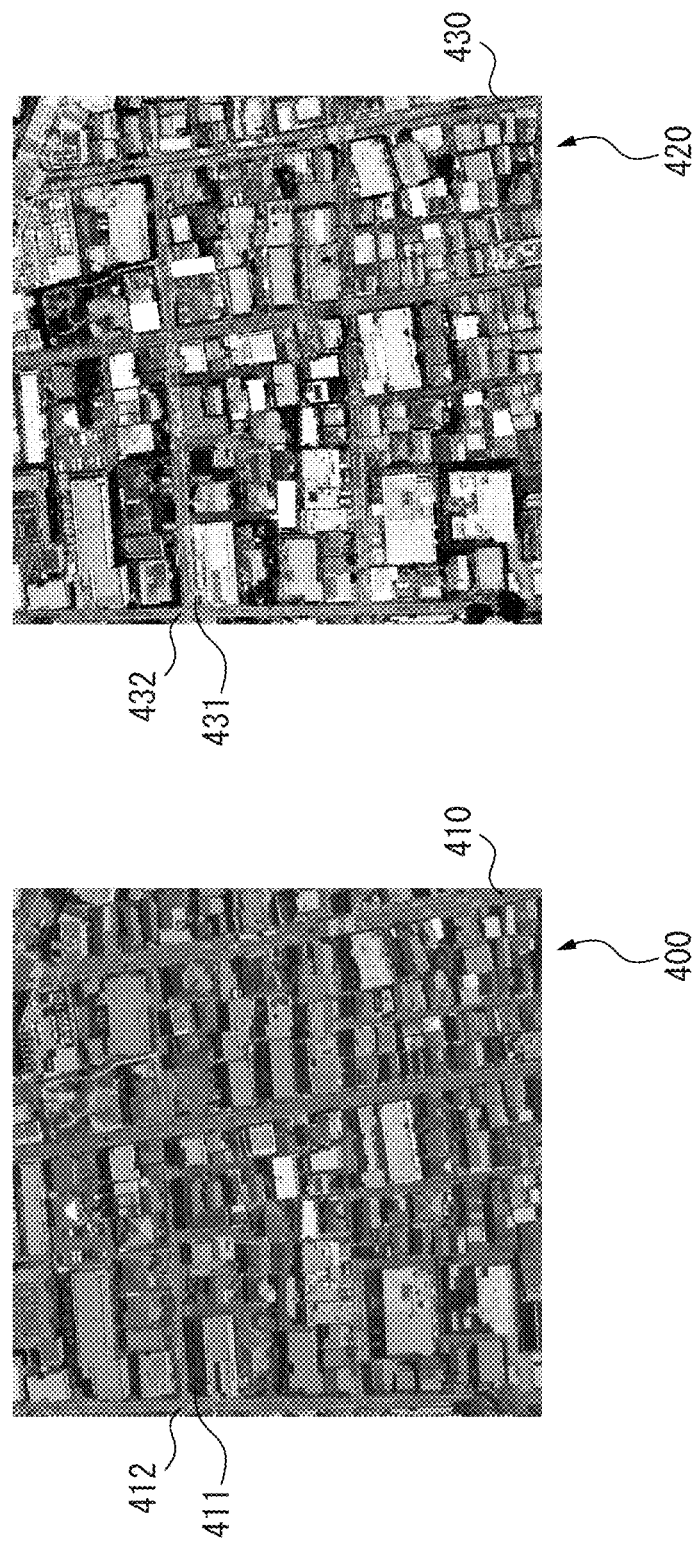
FIG. 4 illustrates an example of differences between an aerial image and a color conversion image.

FIG. 4 illustrates an example of differences between an aerial image and a color conversion image. In a road 410 of an aerial image 400, the contrast between a shadowed road region 411 where a shadow is cast and an unshadowed road region 412 where no shadow is cast is relatively high. In contrast, in a road 430 of a color conversion image 420, it can be seen that the contrast between a shadowed road region 431 where a shadow is cast and an unshadowed road region 432 where no shadow is cast is relatively low.

The color converting unit 14 outputs the generated color conversion image to the road-marking detecting unit 15.

The road-marking detecting unit 15 detects road markings from the color conversion image. To this end, the road-marking detecting unit 15 inputs, for example, the color conversion image into a classifier that has been trained to output, for each pixel of the image, the type of object represented in the pixel, thereby detecting road markings. The road-marking detecting unit 15 may detect road markings only from the road region in the color conversion image detected by the reference-region detecting unit 11.

As the classifier, the road-marking detecting unit 15 may use, for example, a DNN having a CNN architecture. More specifically, the road-marking detecting unit 15 may use, as the classifier, a CNN for semantic segmentation, e.g., a CNN such as FCN, U-Net, SegNet, PSPNet, or RefineNet. Alternatively, the road-marking detecting unit 15 may use, as the classifier, a classifier based on another semantic segmentation technique, such as a random forest. Additionally, the classifier used by the road-marking detecting unit 15 may be the same as that used by the reference-region detecting unit 11.

The road-marking detecting unit 15 stores in the memory 5 information indicating the detected road markings together with the color conversion image, or outputs them to another device via the communication interface 2.

Figure 5:
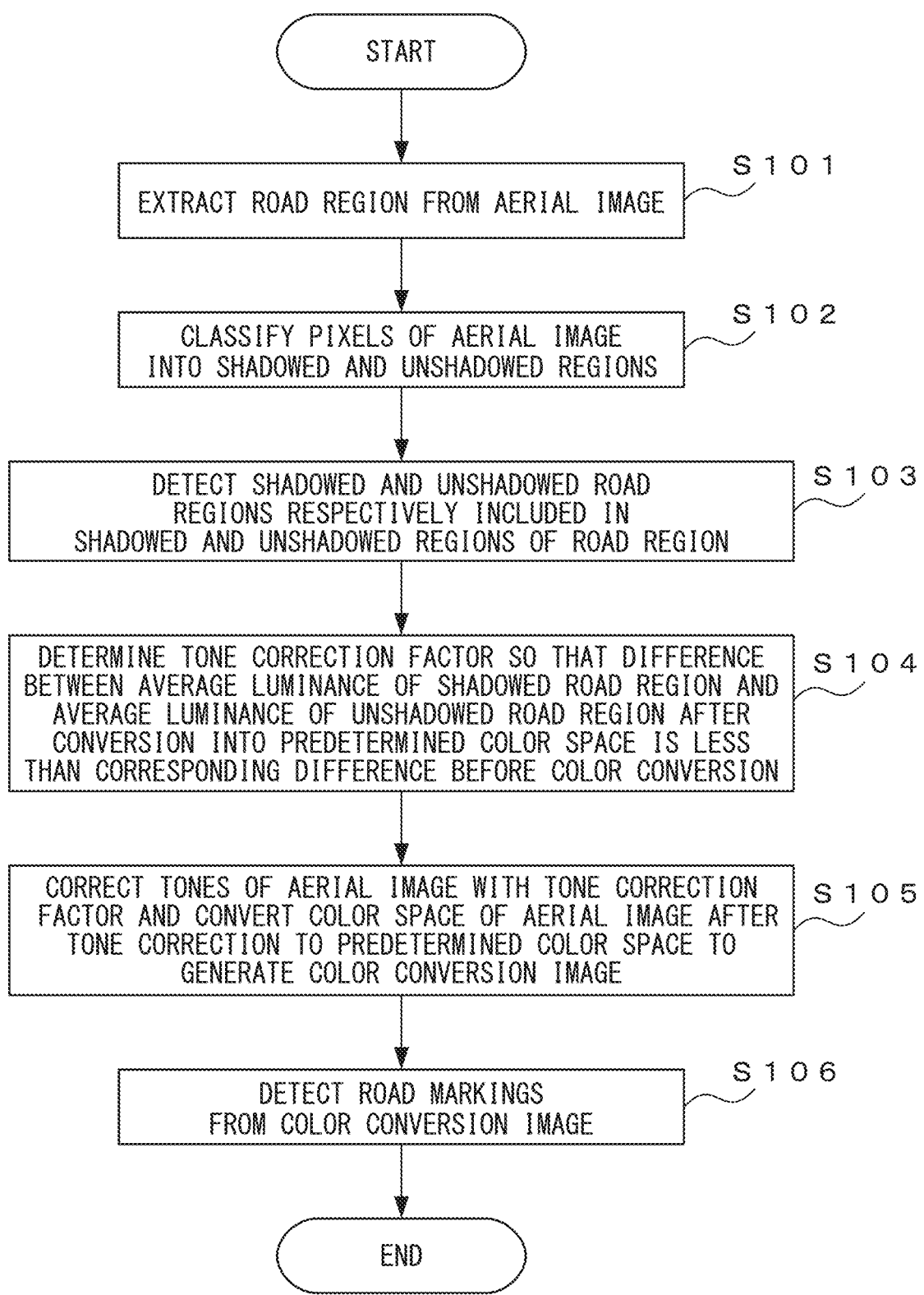
FIG. 5 is an operation flowchart of an image conversion process.

FIG. 5 is an operation flowchart of the image conversion process. The processor 7 may execute the image conversion process in accordance with the following operation flowchart for each aerial image that is a target for the image conversion process.

The reference-region detecting unit 11 of the processor 7 detects, as a reference region, a road region from an aerial image (step S101). The classifying unit 12 of the processor 7 classifies the pixels of the aerial image into shadowed and unshadowed regions (step S102). Of the road region, the classifying unit 12 detects a shadowed road region included in the shadowed region and an unshadowed road region included in the unshadowed region (step S103).

Upon detection of the shadowed and unshadowed road regions, the correction-factor determining unit 13 of the processor 7 determines the tone correction factor so that a difference between an average luminance of the shadowed road region and an average luminance of the unshadowed road region in predetermined color space to which the color space of the aerial image is converted from RGB color space is less than a difference between an average luminance of the shadowed road region and an average luminance of the unshadowed road region in the original aerial image (step S104).

The color converting unit 14 of the processor 7 corrects tones of the aerial image with the determined tone correction factor and converts the color space of the aerial image from RGB color space to the predetermined color space to generate a color conversion image (step S105). Then, the road-marking detecting unit 15 of the processor 7 detects road markings from the color conversion image (step S106). After step S106, the processor 7 terminates the image conversion process.

As has been described above, the apparatus for image conversion determines a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the original aerial image; the shadowed and unshadowed regions are included in a reference region representing a predetermined feature. The apparatus then corrects tones of the aerial image with the determined tone correction factor and converts the color space of the aerial image from RGB color space to the predetermined color space. In this way, a color conversion image is obtained such that the contrast between the shadowed and unshadowed regions is lower than the contrast therebetween in the original aerial image. For this reason, the apparatus can facilitate detection of road markings, using the obtained color conversion image for detection of road markings.

According to a modified example, the classifying unit 12 may execute a process for classification into shadowed and unshadowed regions, which is similar to that executed by the classifying unit 12 in the embodiment, on a reference region representing a predetermined feature, such as a road region, to detect shadowed and unshadowed regions of the reference region. In this case, it is sufficient for the classifying unit 12 to generate a histogram of luminance for the reference region, not for the whole image, and to determine the luminance threshold, based on the histogram of luminance for the reference region, allowing for reducing the amount of computation.

According to another modified example, the reference region is not limited to a road region. The requirement for the reference region is to be a region representing a predetermined feature such that there is no difference except for a difference in luminance caused by the presence or absence of a shadow. For example, the predetermined feature may be a parking space, a playground, an irrigation canal, or a water surface of a river, a pond, or the like. In this case, the reference-region detecting unit 11 can detect a reference region representing such a predetermined feature by inputting an aerial image into a classifier for semantic segmentation that has been trained to identify pixels indicating such a predetermined feature. Then, the classifying unit 12 executes a process similar to that of the embodiment to detect shadowed and unshadowed regions of the reference region representing such a predetermined feature. The correction-factor determining unit 13 executes a process similar to that of the embodiment to determine a tone correction factor, based on the detected shadowed and unshadowed regions.

When the whole aerial image represents a relatively uniform feature, e.g., when it represents a forest and a road passing therethrough, the reference region may be the whole aerial image. In this case, the reference-region detecting unit 11 may be omitted. When detection of road markings from the color conversion image is executed by another device or when the color conversion image is used for a purpose other than detection of road markings, the road-marking detecting unit 15 may be omitted.

A computer program for causing a computer to execute the functions of the units included in the processor of the apparatus according to the embodiment or modified examples may be provided in a form recorded on a computer-readable recording medium. The computer-readable recording medium may be, for example, a magnetic recording medium, an optical recording medium, or a semiconductor memory.

What is claimed is:

1. An apparatus for image conversion, comprising a processor configured to
classify a reference region representing a predetermined feature into a shadowed region where a shadow is cast and an unshadowed region where no shadow is cast, the reference region being in an aerial image represented in RGB color space;
determine a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; and
correct tones of the aerial image with the tone correction factor and convert the color space of the aerial image from RGB color space to the predetermined color space to generate a color conversion image.

2. The apparatus according to claim 1, wherein the processor is further configured to detect, as the reference region, a road region representing a road as the predetermined feature from the aerial image.

3. The apparatus according to claim 1, wherein the processor is further configured to detect a road marking from the color conversion image.

4. The apparatus according to claim 1, wherein the predetermined color space is color space represented by measures including luminance or brightness or obtained by normalizing, with a color component included in RGB color space, the other color components included in RGB color space.

5. A method for image conversion, comprising:
classifying a reference region representing a predetermined feature into a shadowed region where a shadow is cast and an unshadowed region where no shadow is cast, the reference region being in an aerial image represented in RGB color space;
determining a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; and
correcting tones of the aerial image with the tone correction factor and converting the color space of the aerial image from RGB color space to the predetermined color space to generate a color conversion image.

6. A non-transitory recording medium having recorded thereon a computer program for image conversion, the program causing a computer to execute a process comprising:
classifying a reference region representing a predetermined feature into a shadowed region where a shadow is cast and an unshadowed region where no shadow is cast, the reference region being in an aerial image represented in RGB color space;
determining a tone correction factor so that a difference between an average luminance of the shadowed region and an average luminance of the unshadowed region in the aerial image represented in predetermined color space to which the color space of the aerial image is converted from RGB color space is less than a difference between an average luminance of the shadowed region and an average luminance of the unshadowed region in the aerial image represented in RGB color space; and
correcting tones of the aerial image with the tone correction factor and converting the color space of the aerial image from RGB color space to the predetermined color space to generate a color conversion image.

* * * * *